April 26, 1932.  H. S. PLUMMER  1,855,985
INSECT TRAP
Filed Sept. 30, 1931
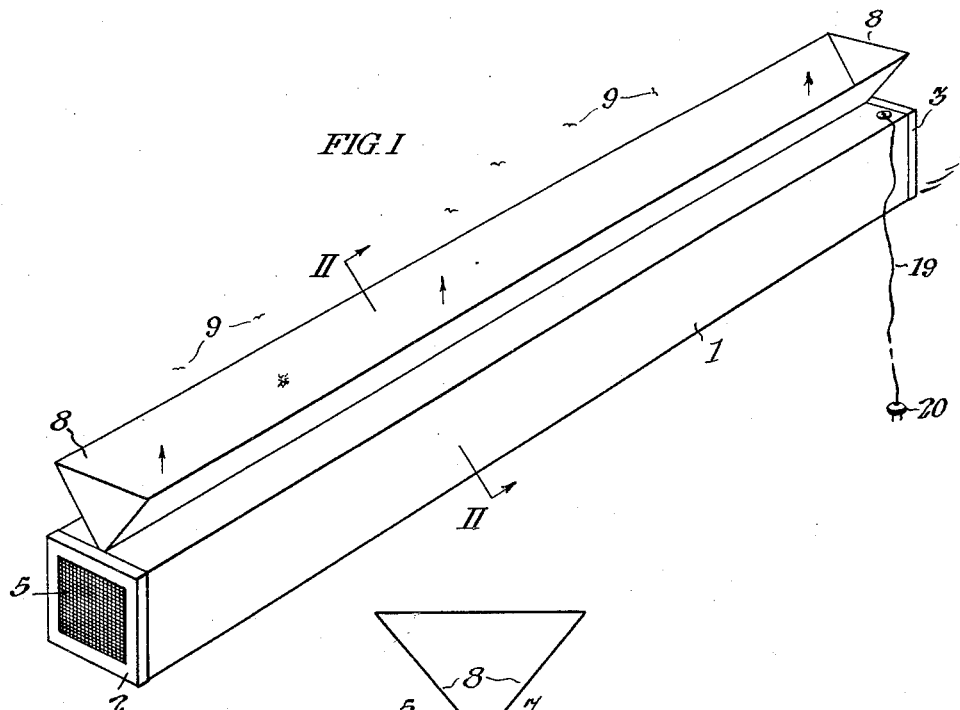
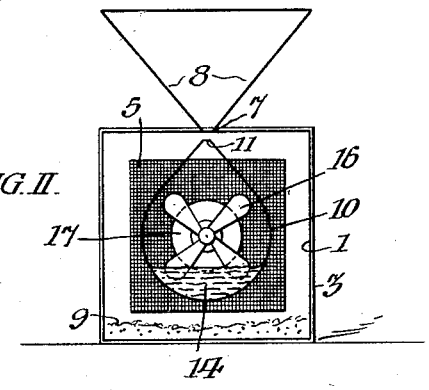
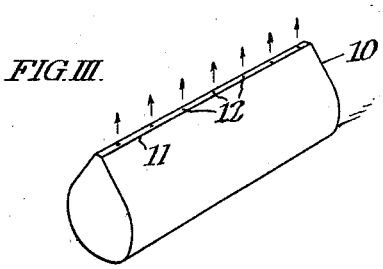
INVENTOR:
HARVEY SHACKELFORD PLUMMER,
BY
Attorney.

Patented Apr. 26, 1932

1,855,985

UNITED STATES PATENT OFFICE

HARVEY SHACKELFORD PLUMMER, OF FAIRVIEW VILLAGE, WORCESTER TOWNSHIP, MONTGOMERY COUNTY, PENNSYLVANIA

INSECT TRAP

Application filed September 30, 1931. Serial No. 565,949.

My invention relates particularly to traps to which insects are attracted by an odor. Ordinarily, such traps are formed of small jars containing the odorous material and emanation of the odor from such traps is effected entirely without any artificial aid, and, consequently, the region throughout which the odor is apparent to the insects is extremely limited and local to the trap. On the contrary, the essential feature of my invention is that means are provided to forcibly facilitate the emanation of the odor from the trap so as to very materially enlarge the area of the region in which insects are subjected to the attraction of the odorous material in the trap. As hereinafter described, the odor is entrained in a stream of air forcibly directed in contiguous relation with the odorous material, by a fan which disseminates the resulting volume of odorous air into the superambient atmosphere. In the form of my invention hereinafter described, the odorous material is inclosed in a tubular casing of considerable length, say, eight feet, extending horizontally, in cooperative relation with an electrically actuated fan; both said tubular casing and fan being inclosed in an outer casing which forms the trap into which the insects are enticed by streams of odorous air emanating from said tube, through a series of perforations throughout its length at the upper edge thereof.

My invention includes the various novel features of construction and arrangement hereinafter more definitely specified.

In said drawings; Fig. I is a perspective view of a trap conveniently embodying my invention.

Fig. II is a transverse sectional view of said trap taken on the line II, in Fig. I, in the direction of the arrow marked thereon.

Fig. III is a fragmentary perspective view of the perforated tube indicated in Fig. II.

In said figures; the outer casing 1 is conveniently formed of rectangular cross section, so that it may be supported upon a flat surface. However, it may be otherwise shaped. Said casing 1 is conveniently provided with removable covers 2 and 3 at opposite ends thereof and said covers preferably have openings therethrough covered with wire screens, as indicated at 5 in Fig. I, for admission of air and light. Said casing 1 has a slot 7 through its top wall extending throughout its length and opening from said casing into the bottom of the trough formed by oppositely inclined panels 8, which may be in unitary relation with the walls of said casing 1, if the latter is formed of sheet metal. Said trough serves to guide insects 9 downward to and through the slot into the interior of the casing 1.

Said outer casing 1 incloses the tubular casing 10, conveniently formed of sheet metal with a ridge 11 at the top thereof which is provided with a series of perforations 12 throughout its length, for the escape of odorous emanations from the material 14 which is conveniently placed in said tubular casing 10 throughout its length. Such material may be saw-dust or other absorbent material impregnated with geranium oil diluted with other cheaper oil, if the insects to be attracted are what are known as Japanese beetles. However, any odorous material may be employed which is adapted to attract, by its odor, the insects which it is desired to trap, and it may be observed that whereas said beetles are attracted by a fragrant odor such as that from geranium oil; other insects, for instance flies, are attracted by odors which are not fragrant.

The rotary fan 16, shown in Fig. II, is inclosed by said casing 1, at one end thereof and in communication with said inner tubular casing 10. Said fan is operatively connected with any suitable means for turning it, preferably the electric motor 17 which may be connected with any source of electrical energy, by any convenient means. For instance, said motor may be adapted to be energized through the conducting cable 19 provided with the double terminal plug 20.

The construction and arrangement above described are such that when said fan 16 is rotated, air is drawn into said casing 1 through the adjacent screen 5, shown in Fig. II and forced into the adjacent open end of said tubular casing 10 from which it escapes through the perforations 12 at the top thereof laden with the odor from the bait material 14 and with the effect of propagating said odor throughout a considerable area surrounding the trap. Insects 9, thus attracted, alight upon the opposite side panels 8 of the trough and pass down the latter into the casing 1 through the slot 7 which is only of sufficient width to admit them. As shown in Fig. II, said inlet is opposed by the ridge 11 of said tube 10 which suffices to deter the trapped insects from escaping. However, the insects may be removed from the trap by opening either of the closures 2 or 3.

It is to be understood that a receptacle for any odorous material, which is bait for the insects to be trapped, may be formed otherwise than as a perforated tube; for instance, it may be an open trough, or such material may be directly deposited in said outer casing 1, for instance upon the floor thereof; the essential feature of my invention being that an odor from insect bait local to the trap is forcibly propagated into the atmosphere surrounding the trap, by means appurtenant to the trap and with the effect of increasing the range of influence and efficiency of the trap.

Therefore, I do not desire to limit myself to the precise details of construction and arrangement herein set forth, as it is obvious that various modifications may be made therein without departing from the essential features of my invention, as defined in the appended claims.

I claim:

1. In an insect trap; the combination with an outer casing having an inlet for insects; of an inner receptacle for odorous material; and means for forcibly directing a current of air in cooperative relation with said receptacle to entrain odor therefrom and carry the same outwardly through said inlet.

2. In an insect trap; the combination with an outer casing; of a fan inclosed by said casing; means for operating said fan; and a receptacle for odorous material, inclosed by said casing, in cooperative relation with said fan; whereby the odor from said material is distributed by the forcible current of air from said fan; wherein the receptacle is a tube having perforations at the top thereof and the trap has an inlet for insects in registry with the perforations of said tube.

3. In an insect trap; the combination with an outer casing having a trough upon the top thereof and a slot at the bottom of said trough leading into said casing and forming an inlet for insects; of a rotary fan operatively connected with an electric motor and inclosed by said casing; whereby air may be forced from said casing outwardly through said inlet; and means for supporting odorous material in said casing in cooperative relation with the stream of air from said fan; whereby the odor from said material is forcibly dispensed from said trap into the surrounding atmosphere.

In testimony whereof I have hereunto signed my name at Conshohocken, Pennsylvania, this twenty-fifth day of September, 1931.

HARVEY SHACKELFORD PLUMMER.